3,737,378
DEODORIZING METHOD BY FILM AND
STEAM DISTILLATION
Akira Mori and Yozi Nagata, Wakayama-shi, and Hiromi Nakagawa, Naka-gun, Wakayama, Japan, assignors to Kao Soap Co., Ltd., Tokyo, Japan
Filed Jan. 26, 1970, Ser. No. 5,522
Claims priority, application Japan, Feb. 1, 1969, 44/7,753
Int. Cl. B01d 3/28, 3/38
U.S. Cl. 203—89
4 Claims

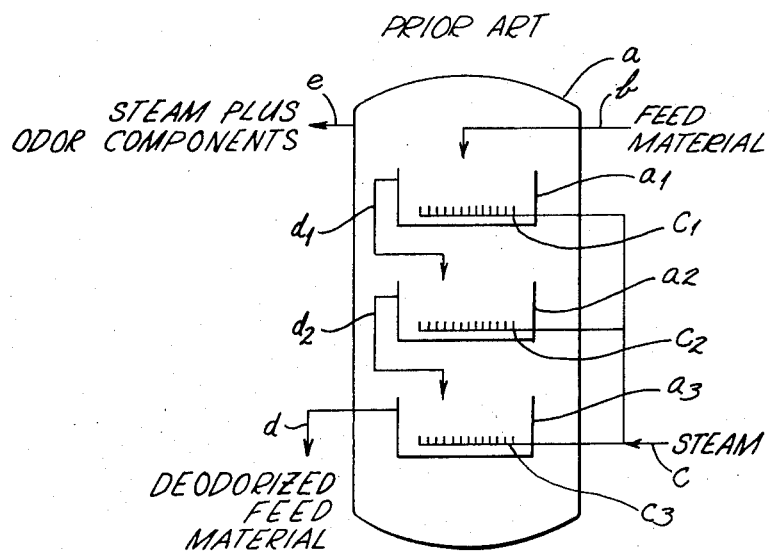
Fig. 1
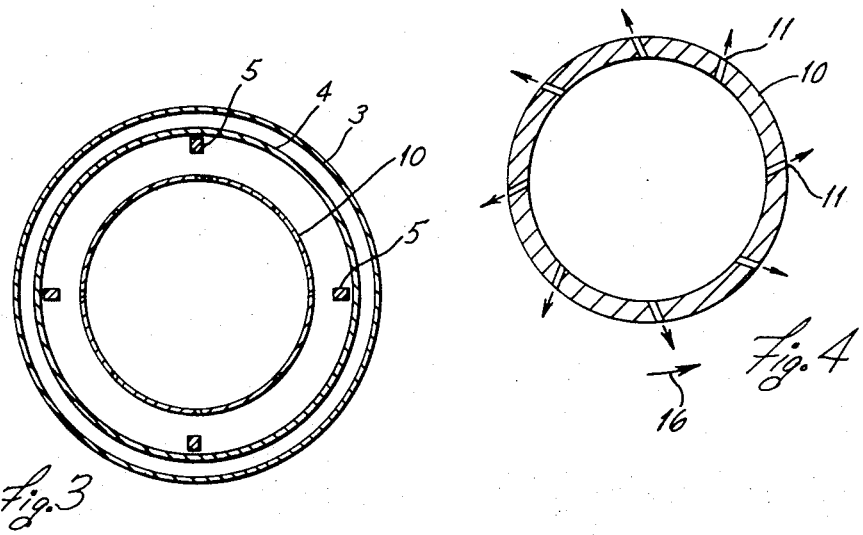
Fig. 3
Fig. 4
INVENTORS
AKIRA MORI
YOZI NAGATA
HIROMI NAKAGAWA United States Patent Office 3,737,378
Patented June 5, 1973

ABSTRACT OF THE DISCLOSURE

A liquid feed material is deodorized by flowing same downwardly in the form of a thin film and blowing steam against the film to remove odor components therefrom. The steam is supplied so that substantially the entire surface of the film is contacted over substantially its entire length with freshly supplied steam.

BACKGROUND OF THE INVENTION

Field of the invention

This invention relates to an improved deodorizing method and apparatus.

Description of the prior art

It is known that steaming is effective for performing deodorization of alcohols, esters, fatty acids, oils, surface active agents and the like. For conducting this steaming process most effectively, an apparatus having good vapor-liquid contact efficiency should be used, but when a thermolabile material is involved, coloring and other problems will be created, so that due consideration should be paid to temperature control and minimization of residence time. Many of the conventional vapor-liquid contacting apparatuses are defective in respect of said temperature control and residence time. Also, a film type evaporator, although satisfactory as to temperature control and residence time, has a drawback that the downwardly flowing liquid film is not always contacted with fresh pure steam because the steam flows countercurrently or concurrently with respect to the downwardly flowing liquid film, thereby resulting in an unsatisfactory deodorizing effect.

SUMMARY OF THE INVENTION

In order to overcome these defects, the present invention provides improvements over the conventional film type evaporator and provides a novel deodorizing method and apparatus in which steam is blown over the surface of the film of fluid flowing down on the evaporating face so that the odorous components are eliminated by contact with fresh pure steam.

BRIEF DESCRIPTION OF DRAWINGS

In the drawings:
FIG. 1 is a schematic illustration showing an embodiment of the conventional apparatus.
FIGS. 2 to 4 show an embodiment of the apparatus according to the present invention, in which FIG. 2 is a longitudinal sectional view, FIG. 3 is a sectional view taken on the line A—A of FIG. 2, and FIG. 4 is an illustration of the steam supply means.

Now, the invention will be described in more detail with reference to the accompanying drawings. FIG. 1 is a schematic illustration of an example of the conventional apparatus wherein deodorization of food oil or the like is conducted semi-continuously and wherein the material, which may have been preheated if so desired, is fed from an inlet $b$ and is placed on a first tray $a_1$ in a deodorizer vessel $a$. At the bottom of the tray $a_1$ are provided steam supply apertures $c_1$. Steaming is effected with steam supplied through an inlet $c$, whereby the odorous components are partly eliminated by entrainment by the steam which is discharged through a vacuum port $e$. The partially deodorized material is conducted through an overflow pipe $d_1$ to a second tray $a_2$. The material is treated in the same manner until it reaches the lowermost tray $a_3$, from whence it is removed in a deodorized state through an overflow pipe $d$. In some cases, heating means are provided in each of the trays $a_1$, $a_2$ and $a_3$.

Figure 2:
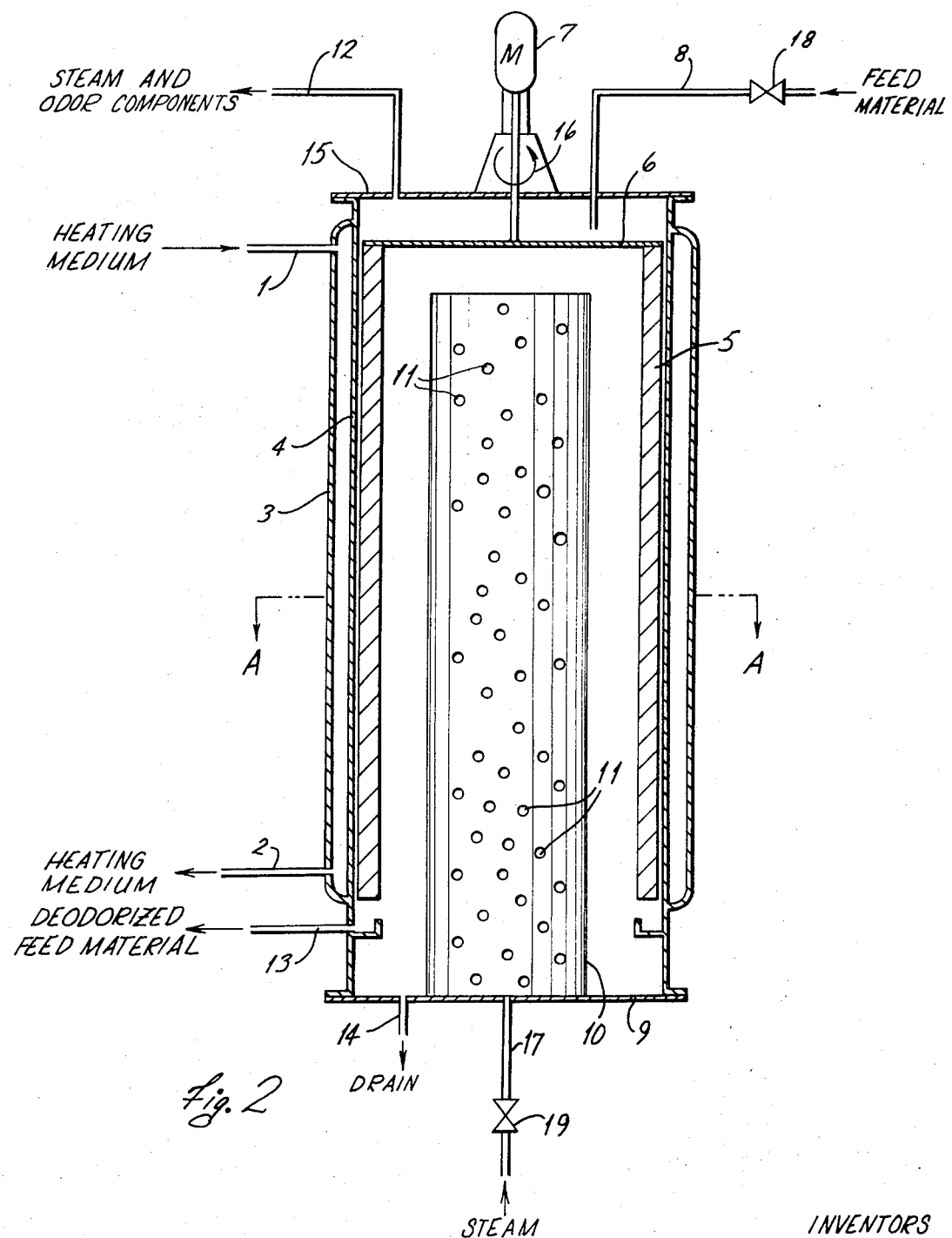

According to the conventional method as described above, however, the residence time of the material is extremely long, which may result in coloring of the feed material, and also it is extremely difficult to completely eliminate the odorous components due to deep liquid depths in the apparatus. Further, when a surface active agent is treated, foams will be produced, so that some countermeasures therefor, such as for example the addition of an anti-foaming agent, must be taken. But generally, the addition of such an anti-foaming agent is, in many cases, undesirable because it causes deterioration of the product quality.

DESCRIPTION OF THE PREFERRED EMBODIMENT

Referring now to FIGS. 2 to 4, there is shown an embodiment of the deodorizing apparatus according to the present invention. The film evaporator shown in these figures comprises a vertical cylinder 4 having mounted thereon an outer shell having an inlet 1 and an outlet 2 for heating medium, and a rotatable wiper 5 comprised of a plurality of upright blades is provided adjacent the inner face of said cylinder. The top of the wiper 5 is connected to a fluid distributor plate 6 which is adapted to be driven by a motor 7. The material is fed from a feeding port 8 at a constant speed onto the distributor plate 6 and is evenly distributed on the inner face of the cylinder 4 by centrifugal force derived from rotation of the distributor plate. The distributed material then flows downwardly along said inner face. An upright steam supply cylinder 10 is secured to the bottom 9 of the cylinder 4 and said cylinder has formed on its peripheral face a plurality of holes 11 through which steam is blow against the fluid flowing down on the inner face of the cylinder 4, whereby the odorous components will be contacted with steam and entrained thereby and eliminated through a vacuum port 12 along with said steam. The steam is supplied into the cylinder 10 from a steam inlet 17. The feed material reaching the bottom of the cylinder 4 is taken out from an outlet port 13 by any suitable method. If need be, a drain trap 14 may be provided. The vacuum port 12 is not necessarily provided at the top wall 15 of the cylinder 4 as shown, but may be provided at the bottom wall 9 to achieve substantially the same effect. The steam supply holes 11 are preferably slightly slanted or inclined with respect to the radial, while maintaining their horizontal orientation, to permit the incoming steam to flow in the same direction as the rotating direction 16 of the wiper 5 as shown in FIG. 4, thereby to prevent splashing or turbulence of the fluid flowing down on the inner face of the cylinder 4. But the holes may as well be directed radially, i.e., perpendicularly with respect to the inner face of the cylinder 4.

As will be understood from the foregoing explanation, according to the deodorizing operation conducted by the deodorizing apparatus of the present invention, the feed material is fed in at a constant rate and is distributed on the inner face of the cylinder 4 by the centrifugal are shown in the following. Odor (and also taste) were determined by an organoleptic test since laboratory analysis of such element is impossible.

|  | Starting material | Product deodorized by the apparatus of the present invention | Product deodorized by a conventional semicontinuous apparatus (FIG. 1) | Product deodorized by a conventional countercurrent film-type evaporator |
|---|---|---|---|---|
| Tallow oil: |  |  |  |  |
| Odor | Strong | Extremely weak | Weak | Weak. |
| Taste | Bad | Good | Slightly bad | Slightly bad. |
| Acid value | 0.42 | 0.012 | 0.06 | 0.06. |
| Treating conditions: |  |  |  |  |
| Material feed rate |  | 60 kg./m. hr | 400 kg./hr | 60 kg./m. hr. |
| Staying time |  | 15 sec | 1 hr | 15 sec. |
| Temperature |  | 220° C | 220° C | 220° C. |
| Pressure (absolute) |  | 3 mm. Hg | 3 mm. Hg | 3 mm. Hg. |
| Wiper speed |  | 1.6 m./sec |  | 1.6 m./sec. |
| Sorbitan monooleate: |  |  |  |  |
| Odor | Strong | Extremely weak | Weak |  |
| Taste | Bad | Good | Slightly bad |  |
| Acid value | 7.5 | 0.40 | 0.45 |  |
| Treating conditions: |  |  |  |  |
| Material feed rate |  | 60 kg./m. hr | 40 kg./hr |  |
| Staying time |  | 20 sec | 1 hr |  |
| Temperature |  | 220° C | 320° C |  |
| Pressure (absolute) |  | 3 mm. Hg | 3 mm. Hg |  |
| Wiper speed |  | 1.6 m./sec |  |  |

NOTE.—The amount of steam used is as follows: steam/material=0.075 (by weight).

force of the distributing plate 6 and flows down on said inner face in the form of a thin film of uniform thickness. The fluid is scraped up by the wiper 5, and also steam is blown against the fluid film, whereby the odorous components are expelled into the steam.

The preferred conditions for carrying out the method of the present invention are as follows:

Material feed rate: 30–100 kg./m. hr.
Steaming rate (steam feed material): 0.01–0.5 (weight ratio)
Temperature: 150–300° C.
Pressure: 1–50 mm. Hg (absolute)
Wiper speed: 1–3 m./sec.

According to the deodorizing method of the present invention, the incoming steam impinges on the surface of the downwardly flowing film, so that the deodorizing effect is little affected by the liquid depth as compared with the steaming method using a conventional apparatus such as shown in FIG. 1. Further, according to the apparatus of the present invention, even if the feed material has a foam-forming property, such as a surfactant, there is no need of adding an anti-foaming agent since the wiper 5 acts as an effective foam breaker. Also in the apparatus of the present invention, a plurality of vertically spaced ring members may be employed as the steam supply means, instead of the cylinder 10 as illustrated in the embodiment as shown in the drawing, and a plurality of steam supply holes may be formed in each ring member such that said holes are directed toward the inner face of the cylinder 4. There are also provided regulating valves 18 and 19 at the feeding port 8 and at the steam inlet 17, respectively, and these valves may be utilized to suitably control the amounts to be supplied of the material and steam in conformity to the properties of the material, thus making it possible to attain best deodorizing efficiency.

The following is an illustrative nonlimiting example of the present invention.

EXAMPLE

Tallow oil (triglyceride consisting of fatty acids having 12 to 18 carbon atoms) and sorbitan monooleate have respectively been subjected to deodorizing treatments by using (1) conventional deodorizing apparatuses and (2) an apparatus according to the present method. The results In other tests conducted with respect to alcohols, fatty acids, surfactants and the like in the same manner, the results showed that the apparatus and method of the present invention can produce a better deodorizing effect than the conventional known apparatus and methods.

The embodiments of the invention in which an exclusive property or privilege is claimed are defined as follows:

1. A method for deodorizing an odorous fluid, which comprises the steps of:

continuously flowing a stream of an odorous fluid downwardly along the inside surface of an elongated outer wall of a chamber and forming said stream into an agitated, thin annular film by wiping the surface of said fluid in close proximity to said wall, the annular film extending substantially the entire length of said wall;

simultaneously blowing fresh steam substantially horizontally directly against the downwardly flowing thin annular film of fluid over the entirety of a zone which covers substantially the entire surface of the thin annular film and extends substantially the entire length of said wall so that substantially the entirety of the agitated thin annular film is contacted by the fresh steam whereby the odorous components are removed from the fluid.

2. A method according to claim 1, including the step of feeding the incoming odorous fluid onto a rotating distributor plate and thereby forming the incoming odorous fluid into a cylindrical film by the centrifugal force derived from the rotation of the distributor plate.

3. A method according to claim 1, in which fresh steam is supplied to steam supply means having a multiplicity of circumferentially and axially spaced steam discharge ports opening toward the film so that fresh steam is directed against the entire surface of the film.

4. A method according to claim 1, in which the feed rate of the odorous fluid is in the range of from about 30 to 100 kg./hr., the weight ratio of steam to odorous fluid is in the range of from about 0.01 to 0.5 to 1, the temperature is in the range of from about 150 to 300° C., the pressure is in the range of from about 1–50 mm. Hg (absolute) and the wiping speed is in the range of from about 1 to 3 m./sec.

(References on following page)

References Cited
UNITED STATES PATENTS

| | | | |
|---|---|---|---|
| 2,542,270 | 2/1951 | Zahn | 159—6 W |
| 2,766,193 | 10/1956 | Schneider | 202—236 |
| 2,779,724 | 1/1957 | Dunning et al. | 202—236 |
| 3,428,530 | 2/1969 | Fauche et al. | 159—6 W |
| 3,090,732 | 5/1963 | Pinkuart et al. | 202—236 |
| 3,496,240 | 2/1970 | Sturzenegger | 159—6 W |
| 2,674,609 | 4/1954 | Beal et al. | 260—428 |
| 2,991,298 | 7/1961 | Raffaeta | 260—428 |
| 3,272,851 | 9/1966 | Sunde et al. | 260—428 |
| 3,197,386 | 7/1965 | Lau | 203—92 |
| 253,802 | 2/1882 | Wise | 202—234 |
| 3,054,729 | 9/1962 | Smith | 203—89 |
| 3,129,076 | 4/1964 | De Smet | 260—428 |
| 3,476,656 | 11/1969 | Van Tassell et al. | 203—89 |

WILBUR L. BASCOMB, JR., Primary Examiner

U.S. Cl. X.R.

203—92, 96; 202—234, 236; 260—428